United States Patent [19]

Wanlass

[11] 3,735,277

[45] May 22, 1973

[54] MULTIPLE PHASE CLOCK GENERATOR CIRCUIT

[75] Inventor: Frank M. Wanlass, Cupertino, Calif.

[73] Assignee: North American Rockwell Corporation, El Segundo, Calif.

[22] Filed: May 27, 1971

[21] Appl. No.: 147,557

[52] U.S. Cl. ..................331/45, 307/221 C, 307/251, 307/262, 328/57, 328/62, 331/60, 331/111, 331/135

[51] Int. Cl. ......H03b 5/20, H03b 19/12, H03k 23/08

[58] Field of Search ................331/45, 60, 61, 108 D, 331/111, 135; 307/262, 221 R, 221 C, 251; 328/57, 62

[56] References Cited

UNITED STATES PATENTS 3,241,033 3/1966 Peaslee et al. ................307/221 R X 3,596,188 7/1971 Haase................................331/45 X

*Primary Examiner*—Roy Lake

*Assistant Examiner*—Siegfried H. Grimm

*Attorney*—L. Lee Humphries and H. Fredrick Hamann

[57] ABSTRACT

A clock signal generating circuit including an oscillator circuit for supplying complementary square wave gating signals to a multi-bit shift register. One shift register bit is required for each two clock pulse phases. Output signals from each bit position of the shift register are provided as input signals to NOR gates which also receive feedback input signals from the output terminals of certain of the NOR gates to synchronize the phase relationship between the multiple phase clock signals produced by the output logic gates. The output signals from the NOR gates comprise the multiple phase clock signals.

11 Claims, 6 Drawing Figures

Patented May 22, 1973 3,735,277

6 Sheets-Sheet 1

INVENTOR
FRANK M. WANLASS
BY
Robert G. Rogers
ATTORNEY

INVENTOR
FRANK M. WANLASS
BY Robert G. Rogers
ATTORNEY

Patented May 22, 1973 3,735,277

6 Sheets-Sheet 3

INVENTOR
FRANK M. WANLASS
BY Robert G. Rogers
ATTORNEY

Patented May 22, 1973 3,735,277

6 Sheets-Sheet 4

INVENTOR
FRANK M. WANLASS
BY Robert G. Rogers
ATTORNEY

INVENTOR
FRANK M. WANLASS
BY Robert G. Rogers
ATTORNEY

TABLE II

INVENTOR
FRANK M. WANLASS
BY
Robert G. Rogers
ATTORNEY

MULTIPLE PHASE CLOCK GENERATOR CIRCUIT

BACKGROUND OF THE INVENTION

1. Field of the Invention

The invention relates to a multiple phase clock signal generator circuit and more particularly to such a generator circuit which uses an RC network to generate signals having a basic frequency, and a multi-bit shift register responsive to the basic frequency signals for generating control signals to logic gates providing the multiple phase clock signals as outputs.

2. Description of Prior Art

One prior art multiple phase clock signal generator requires a 16 bit ring counter to generate the signals required to produce multiple phase clock signals having the desired phase relationship. In addition, an oscillator for such counter using field effect transistors may use an external resistor with an internal (on the chip) field effect transistor utilized as a resistor in a voltage divider network. It has been found that such an oscillator circuit is susceptible to temperature variations. As a result, the external resistor must be precisely selected to give the proper operating frequency.

Examples of prior art multiple phase clock signal generators can be found by referring to U.S. Pat. No. 3,350,659 to W. Henn for a Logic Gate Oscillator, issued Oct. 31, 1967, (Cl. 331-57), U.S. Pat. No. 3,382,455, to A. K. Rapp for A Logic Gate Pulse Generator, issued May 7, 1968 (Cl. 331-111), and U.S. Pat. No. 3,539,938 to Gary L. Heimbigner for Multiple Phase Clock Signal Generator, issued Nov. 10, 1970 (Cl. 331-57).

A multiple phase clock signal generator is preferred which is substantially reduced in size, which is less susceptible to temperature variations, and which maintains a synchronized relationship between the multiple phase clock signals at an output. The circuit described herein provides the desired advantages.

SUMMARY OF THE INVENTION

Briefly, the invention comprises a multiple phase clock signal generator using an RC oscillator network in combination with a plurality of inverters for generating square wave output signals forming the basic frequency unit for the multiple phase output signals. However, a pulsed input in lieu of an RC network can be used. In certain applications, synchronizations to an external phasing scheme may be desired.

A multi-bit shift register receives the square wave signals from the oscillator and provides multiple output signals from each bit position of the shift register. Certain of the output signals are inverted to generate a plurality of signals from the shift register having the desired phase relationship. A plurality of logic gates receive the inverted and uninverted signals from the multi-bit shift register along with signals fed back from the output terminals of the logic gates, to provide an exclusive gating arrangement in which the multiple phase output signals from the logic gates have a synchronized relationship. By utilizing the feedback, the phase relationship between each of the multiple phase clock signals can be strictly maintained. It might otherwise be possible for an overlap to occur between consecutive phases.

OBJECTS AND ADVANTAGES

Therefore, it is an object of this invention to provide an improved multiple phase clock signal generator utilizing an RC time constant.

Another object of this invention is to provide an improved multiple phase clock signal generator using an RC network as part of an oscillator circuit and a multi-bit shift register responsive to the oscillator circuit for providing output gating signals to logic gates generating the multiple phase clock signals.

A still further object of this invention is to provide an improved multiple phase clock signal generator in which a square-wave oscillator provides input signals to a multi-bit shift register having a number of bit positions determined by the number of phases required at the output of the multiple phase clock signal generator.

These and other objects of this invention will become more apparent when the following description is read in conjunction with the attached drawings.

DESCRIPTION OF PREFERRED EMBODIMENT

Figure 1:
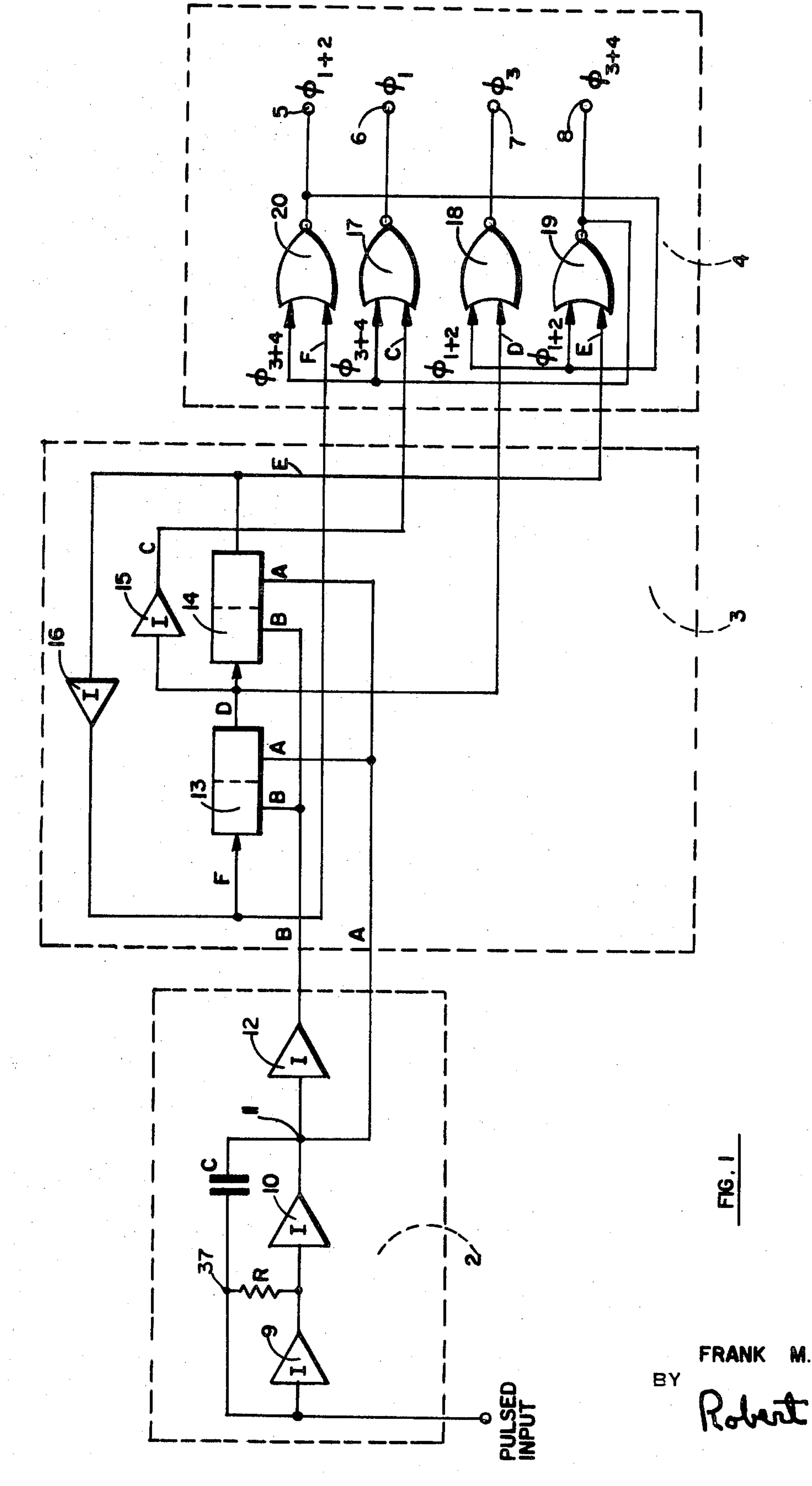
FIG. 1 is a block diagram of the multiple phase clock signal generator.

FIG. 1 is a block diagram of one embodiment of a multiphase clock signal generator including an oscillator circuit 2, a multi-bit shift register circuit 3, and an output logic gating circuit 4. The oscillator circuit 2 includes inverters 9, 10 and 12 connected in series with the output of inverter 9 connected to the input of inverter 10 and the output of inverter 10 connected to the input of inverter 12. Resistor R is connected from the output to the input of inverter 9. Capacitor C is connected between the output of inverter 10 and the input of inverter 9. The output terminals of inverters 10 and 12 are connected as the output terminals of oscillator 2.

Figure 5:
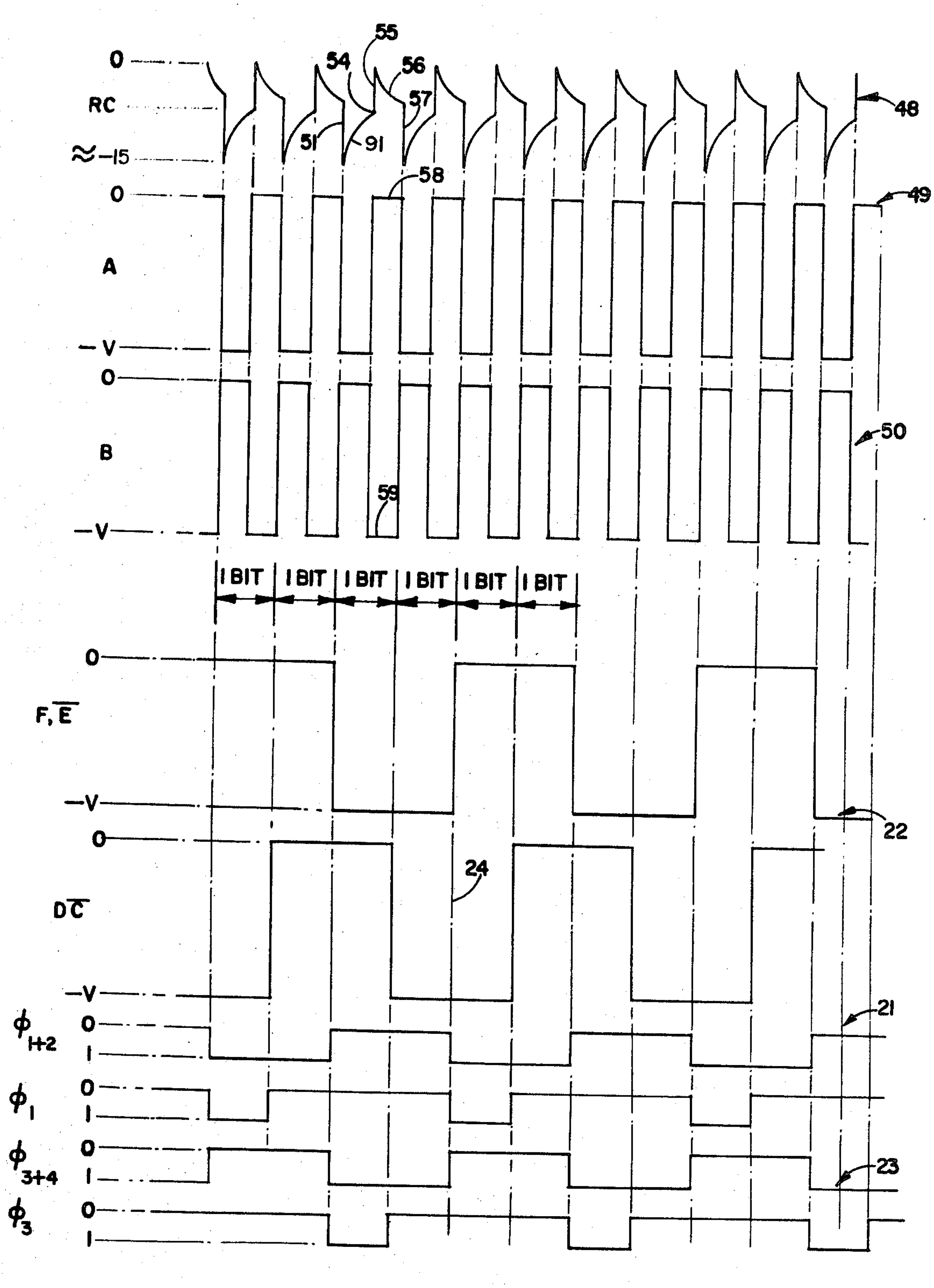
FIG. 5 is a diagram of signal waveforms detected at various points in the circuit shown in FIG. 1.

The operation of oscillator circuit 2 is well known in the art. Briefly, the signal at the input of input terminal of inverter 9 is inverted thereby and produced as the complement signal at the output terminal of inverter 9. The inverted signal is supplied to the input terminal of inverter 10 which operates thereupon and produces an inverted output signal which is substantially similar to the input signal at the input terminal of inverter 9. However, the RC network is continually charging and discharging in accordance with the RC time constant thereof whereby the signal at the input terminal of inverter 9 is continually changing in level whereby a substantially alternating signal (see line RC of FIG. 5) is produced. This signal, applied at the input of inverter 9, effectively causes an output signal at terminal 11 which is alternating in nature. Inverter 12 causes signal B (the complement of signal A) to be produced. Thus, oscillator circuit 2 provides output signals A and B as input signals to the multi-bit shift register. Signal B is the inverse of signal A as shown in FIG. 5.

Shift register 3 shown in FIG. 1 includes two bit positions or shift register cells 13 and 14 connected in series. Each of shift register cells 13 and 14 provides two outputs. In particular, each of shift register cells 13 and 14 includes an input terminal connected to the output terminal of inverter 12 to receive the B signal therefrom. In addition, each of the shift register cells 13 and 14 has an input terminal connected to the output of inverter 10 (circuit point 11) to receive the signal A. The output terminal of shift register cell 13 is connected to an input terminal of shift register cell 14 and to the input terminal of inverter 15. Signal D is supplied at the output terminal of shift register cell 13. The output of shift register cell 14 is connected to the input terminal of inverter 16 and to an input terminal of NOR gate 19 in gating circuit 4. The signal E is supplied along these lines. The output terminal of inverter 16 is connected to the data or information input terminal of shift register cell 13 as well as to an input terminal of NOR gate 20 in gating circuit 4. The signal F is supplied along these lines. The output terminal of inverter 15 is connected to an input terminal of NOR gate 17 of gating circuit 4. The signal C is supplied along this line. Since the present embodiment generates four phase output signals, only a two bit shift register is required. Of course, other types of shift registers may be utilized. If eight phases were required, a four bit shift register might be necessary. The B signal is used to gate information into a bit position and the A signal gates the information out.

The two bit shift register 3 generates four output signals C, D, E, and F. The D and E signals are inverted by inverters 15 and 16 to form the C and F signals respectively.

The C, D, E, and F signals are supplied to NOR gates 17, 18, 19 and 20 included in logic gating circuit 4. NOR gates 17-20 provide a true, i.e., logic 1, output signal when signals at both input terminals are false. The other input signals to the NOR gates 17-20 are received from the outputs designated by terminals 5, 6, 7, and 8 and represent phase clock signals $\phi_{1+2}$, $\phi_1$, $\phi_3$, and $\phi_{3+4}$ respectively. Feedback is utilized to synchronize the phase relationship between the various four phase signals being generated. For example, since gate 20, which produces clock signal $\phi_{1+2}$ receives $\phi_{3+4}$ and F as input signals, clock signals $\phi_{1+2}$ cannot become true until both input signals to gate 20 are false. As a result, it is impossible for a phase overlap to exist between the $\phi_{3+4}$ and the $\phi_{1+2}$ clock signals except when both signals are below one threshold voltage. When the signals are less than a threshold voltage level, they do not exert control.

In operation, inverter 9 produces an output signal (e.g., positive) which is applied to inverter 10 and by which capacitor C is charged through resistor R to provide an input signal (e.g., positive going) to inverter 9. Inverter 10 inverts the signal supplied thereto and produces negative signal A and circuit point 11. When the proper threshold signal level has been reached at capacitor C, inverter 9 is effectively "triggered" and provides an invalid or negative output signal which is supplied to the input terminal of inverter 10 which now generates the inverted (positive) signal A at point 11. The stored charge on C then begins to discharge through resistor R and inverter 9 so that the signal level at the input terminal of inverter 9 changes. Again, when the input signal at inverter 9 (across capacitor C) reaches the threshold level (e.g. negative going), inverter 9 is "triggered" and provides a positive output signal. This operation continues on a substantially free running basis with the pulse period defined by the RC time constant. This operation suggested by the waveform RC of FIG. 5. The signal A at point 11 is supplied to and inverted by inverter 12 to provide signal B. Signals A and B are the output signals of oscillator 2. Signal A is provided at the other output.

As an alternate embodiment, the RC network can be switched out of the circuit to permit a pulsed input as shown in FIG. 1. The switches are omitted for convenience.

Whenever signal B is true, logic information represented by signals F and D is shifted into bit positions 13 and 14 of the two bit shift register 3. When signal B becomes false, signal A becomes true and the information previously shifted or loaded into shift registers 13 and 14, during signal B is shifted out as signals D and E from bit positions 13 and 14, respectively. The signals D and E are inverted by inverters 15 and 16 respectively to provide inputs to the bit positions 13 and 14.

The C, D, E, and F signals are provided as input signals to input terminals of NOR gates 17, 18, 19 and 20 respectively. In addition, NOR gates 17 and 20 receive the $\phi_{3+4}$ clock signal from output terminal 8 at the output of gate 19. The $\phi_{1+2}$ clock signal is supplied from terminal 5 at the output of gate 20 to provide input signals to NOR gates 18 and 19.

The following table illustrates the logic for the multiple phase clock signals $\phi_1$, $\phi_3$, $\phi_{1+2}$ and $\phi_{3+4}$ provided at output terminals 5 through 8.

Table I $\phi_{1+2} = F\phi_{3+4}$
$\phi_{3+4} = E\phi_{1+2}$
$\phi_1 = \phi_{3+4}$ C
$\phi_3 = \phi_{1+2}$ D As shown in FIG. 5, the period of oscillation for each of the signals C through F is four times the period of oscillation for the oscillator square wave output signals A and B. Each cycle of the signals A and B represents one phase (e.g. $\phi_1$, $\phi_3$ etc.) of a multiple phase output signal.

Signal $\phi_{1+2}$ is true (i.e. level 1) as shown in FIG. 5 when the F signal is false (i.e., level 0) and the $\phi_{3+4}$ signal is concurrently false (i.e., level 0). Dashed line 24 illustrates that $\phi_{1+2}$ becomes false (i.e., level 0) at the trailing (i.e., negative going) edges of the F and the $\phi_{3+4}$ signals. A similar comparison can be made for each of the multiple phase clock signals.

Figure 6:
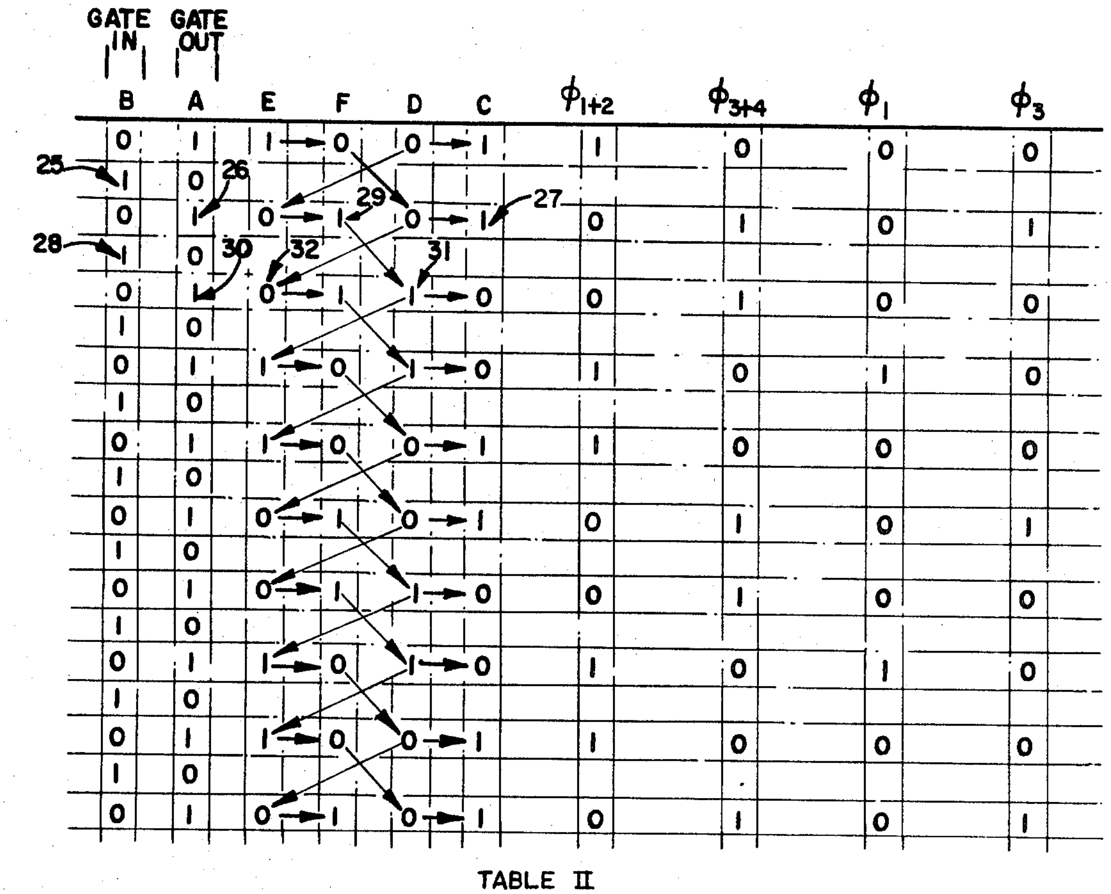
FIG. 6 is a Truth Table illustrating the gating effect of the shift register shown in FIG. 3.

The truth Table 2 shown in FIG. 6 illustrates the gating effects of the oscillator signals A and B. The arrows indicate the shift of the information represented by signals F and D in and out of the bit positions represented by shift register calls 13 and 14 of the multi-bit shift register 3.

As illustrated in the Truth Table of FIG. 6, when F is false (i.e., at level 0) and B is true (i.e., level 1), designated by numeral 25, the false state of F is loaded into bit position 13 of the two bit shift register. Thereafter, when A becomes true, designated by numeral 26, the false state of F is shifted out of bit position 13 as signal D having the same false state. Signal D is then inverted by inverter 15 to become signal C, designated by numeral 27. Similarly, the D information is loaded into bit position 14 when B is true designated by numeral 28. At the same time, the F information designated by numeral 29 is being loaded into bit position 13. When the A signal becomes true during the next cycle, numeral 30, the F and D signals are shifted from the bit positions 13 and 14 as D and E signals numerals 31 and 32 respectively. Other examples can be given but it is not believed necessary.

The phase relationship between the multiple phase clock signals is also shown in Table 2. The logic 1 designations represent the true state of the multiphase clock signals and the logic 0 bits represent the false state of the multiple phase clock signals. As indicated above, a single bit of information is equivalent to one cycle of the basic oscillator signals A and B as shown in FIG. 5.

Figure 2:
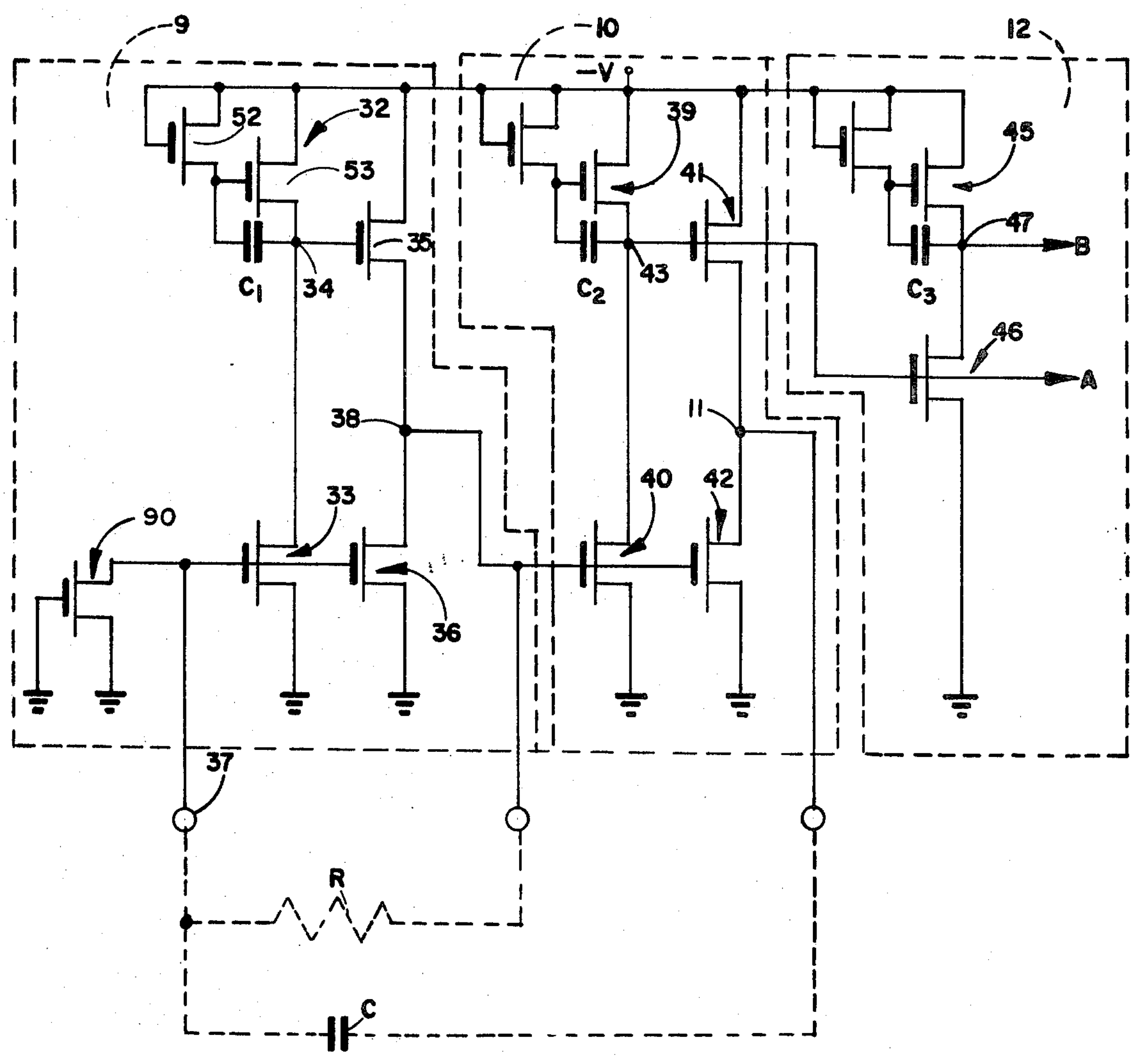
FIG. 2 is a schematic diagram of the oscillator circuit shown in FIG. 1 implemented by field effect transistors.

FIG. 2 is a schematic diagram of one embodiment of the oscillator circuit 2 shown in FIG. 1. Inverter 9 includes bootstrap circuit 32 connected in series with the connection path of inverter field effect transistor 33 between −V and electrical ground. Bootstrap circuit 32 includes field effect transistor 52 which has the gate and source electrodes thereof connected to source −V and the drain electrode connected to the gate electrode of field effect transistor 53. The conduction path (i.e., source to drain) of field effect transistor 53 is connected between source −V and common point 34. The gate electrode of field effect transistor 35 and the source electrode of field effect transistor 33 are connected at common point 34. Capacitor $C_1$ (which may be inherent capacitance) is connected between the gate and drain electrode of field effect transistor 34. The output signal produced from point 34 between the bootstrap circuit 32 and inverter field effect transistor 33 is provided as an input signal to field effect transistor 35 comprising one half of a push-pull output stage of inverter 9. The push-pull output stage is required in order to provide sufficient drive for the next stage. The other half of the push-pull output stage is provided by field effect transistor 36 which is connected to receive a signal on its gate electrode from the RC common connection point 37 which is the input terminal of inverter 9. The gate electrode of field effect transistor 33 is also connected to common point 37. The output from inverter 9 is produced at common point (output terminal of inverter 9) 38 between field effect transistors 35 and 36. The resistor R is connected between common point 37 and common point 38.

Inverter 10 has the same circuit configuration as inverter 9 and includes bootstrap circuit 39 connected in series with an inverter field effect transistor 40. The push-pull output stage of inverter 10 comprises field effect transistors 41 and 42 connected in electrical series between −V and electrical ground. The gate electrodes of field effect transistors 40 and 42 are connected together and operate as the input terminal for inverter 10 and, thereby, receive an input signal from the output terminal 38 of inverter 9. The gate electrode of field effect transistor 41 is connected to common point 43 between bootstrap circuit 39 and inverter field effect transistor 40.

The signal A is obtained at common point 43. Capacitor C is connected from output terminal 14 of the push-pull stage of inverter 10 between field effect transistors 41 and 42 to input terminal 37 of inverter 9.

Inverter 12 is similar to inverters 9 and 10 without the push-pull output stage. The push-pull output stage is not required at inverter 12 since the output signal from inverter 12 does not drive the next stage. However, inverter 12 includes bootstrap circuit 45 connected in electrical series with inverter field effect transistor 46 between −V and electrical ground. The gate electrode of field effect transistor 46 is connected to common point 43 such that signal A from inverter 10, provides an input signal to the gate electrode of field effect transistor 46. Therefore, when signal A is true, field effect transistor 46 is conductive and output, terminal 47 of inverter 12 is connected to electrical ground. Since signal B is taken from point 47, signals A and B have the opposite phase relationship.

The operation of the FIG. 2 circuit can best be understood by referring to signals 48, 49 and 50 shown in FIG. 5. Initially, assume that field effect transistors 33 and 36 are off. As a result, point 38 is driven to approximately −V (less one threshold voltage) by the action of bootstrap circuit 32 which provides a −V voltage level on the gate electrode of field effect transistor 35. The voltage at circuit point 38 turns field effect transistors 40 and 42 on thereby connecting points 43 and 44 to electrical ground. As a result, capacitor C is charged through resistor R by the voltage level difference between points 38 and 11. The RC signal 48 at point 37 is charged towards a negative voltage level as indicated by the portion of the signal designated by numeral 51. Field effect transistor 90 acts as a protective device and becomes conductive for clamping point 37 to a safe positive voltage level.

As soon as the voltage at point 37 is in excess of the threshold voltage levels for field effect transistors 33 and 36, the transistors become conductive thereby connecting point 38 to electrical ground through field effect transistor 36. When the field effect transistors 33 and 36 become conductive, field effect transistors 40 and 42 are turned off and point 44 is driven to approximately −V through field effect transistor 41. Since the voltage across capacitor C cannot charge instantaneously. Point 37 then becomes more negative by capacitor action as indicated by portion 51 of the signal. Simultaneously, the A signal taken from point 43 is driven to approximately −V through the bootstrap circuit 39. Since field effect transistor 46 is turned on by the application of the true level of signal 49 to its gate electrode, the B signal taken from point 47 is driven to electrical ground.

When point 34 is connected to electrical ground, capacitor C1 is charged to a voltage level one threshold less than −V through field effect transistor 52. Thereafter the field effect transistor 52 is turned off. During the next cycle when field effect transistor 33 is turned off, point 34 changes from approximately electrical ground to approximately −V. The change in the voltage level is fed back across capacitor C1 to the gate electrode of field effect transistor 53 comprising the bootstrap circuit 32. The feedback voltage substantially enhances the conduction of field effect transistor 53 to drive point 34 to substantially the −V voltage level. The increase in the voltage level at point 34 enables field effect transistor 35 to provide an output voltage at point 38 equal to −V reduced by a single threshold drop across field effect transistor 35. The other bootstrap circuits operate in substantially the same manner.

When field effect transistors 33 and 36 were turned on, point 38 was connected through field effect transistor 36 to electrical ground. As a result, the charge across capacitor C is discharged towards electrical ground as indicated by the portion of signal 48 designated by numeral 91. The capacitor discharges until the voltage at point 37 is less than the threshold voltage level required to maintain the conduction of field effect transistors 33 and 36. When that occurs as indicated by numeral 54, field effect transistors 33 and 36 are turned off and field effect transistors 40 and 42 are turned on. The voltage at point 44 changes from a negative voltage to electrical ground. The change in the voltage at point 11 is immediately transferred to point 37 by capacitor action. The change at point 37 is indicated by the rapid change in signal 48 designated by numeral 55. The voltage at point 37 is prevented from going more positive than electrical ground since the junction of field effect transistor 90 becomes conductive to clamp point 37 to approximately electrical ground.

Capacitor C then begins to charge so that the voltage at point 37 is reduced as a function of the RC time constant, i.e., the voltage at point 37 becomes more negative as capacitor C is charged to the difference between the voltage levels at point 38 and at point 11. The charging action is designated by numeral 56 for signal 48 as shown in FIG. 5. Whenever the threshold voltage levels of field effect transistor 33 and 36 have been overcome, the field effect transistors are turned on and point 38 is changed from a negative voltage to approximately electrical ground. Simultaneously, point 11 is changed from electrical ground to a negative voltage. The change in the voltage at point 11 is immediately reflected at point 37 by rapid change in the voltage level at point 37 from slightly in excess of the threshold voltage for transistors 33 and 36 to a substantially more negative voltage. The change is designated by numeral 57 on signal 48 as shown in FIG. 5. Thereafter, capacitor C charges through resistor R in the opposite direction as in the previous cycle.

It is pointed out that when the field effect transistors 40 and 42 became conductive as designated by the numeral 55 for signal 48 in FIG. 5, field effect transistor 46 was turned off. As a result at point 47, signal B, became more negative and at point 43 signal A was driven to electrical ground. Numerals 58 and 59 identify the portions of the A and B signals involved at that particular time.

Figure 3:
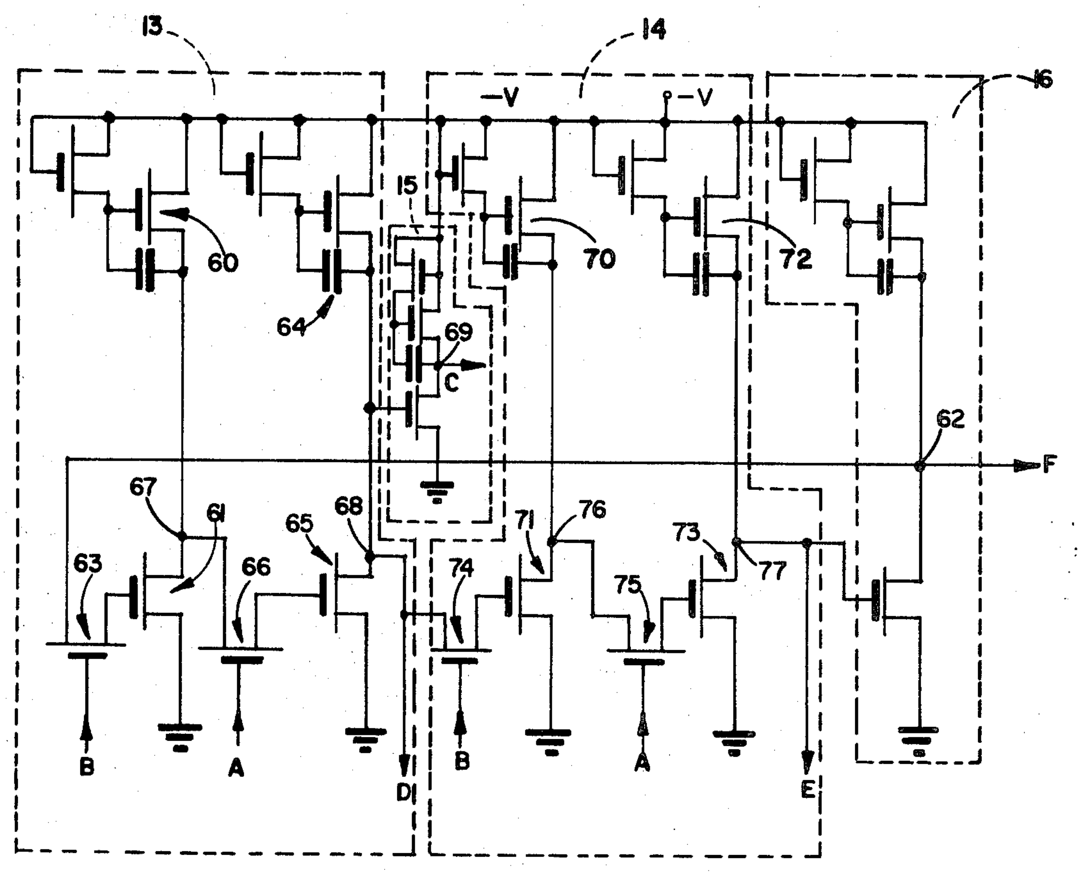
FIG. 3 is a schematic diagram of the multi-bit shift register shown in FIG. 1 implemented by field effect transistors.

FIG. 3 is a schematic diagram of the two bit shift register shown in FIG. 1. Inverters 15 and 16 each comprise substantially the same circuit as shown and described in connection with FIG. 2 for inverters 9, and 10 with the exception that the inverters 15 and 16 do not utilize a push-pull output stage. In other words, inverters 15 and 16 are similar to inverter 12 shown in FIG. 2. For that reason, a detailed circuit description of inverter 15 and 16 is not given for the inverters in FIG. 3.

Bit positions (or shift register cells) 13 and 14 both comprise substantially the same circuit configuration. The inputs and outputs are different as described previously.

Bit position 13 is divided into two stages, each representing one half of the bit position. Both stages have identical circuitry. The first stage of the bit position or cell includes bootstrap circuit 60 connected in series with inverter field effect transistor 61 between −V and electrical ground. The F signal taken from point 62 is selectively gated into bit position 13 by field effect transistor 63. Field effect transistor 63 is gated by oscillator signal B.

The second stage of the bit position 13 includes bootstrap circuit 64 connected in electrical series with inverter field effect transistor 65 between source −V and electrical ground. Field effect transistor 66 connected between the output terminal 67 of the first stage and the input terminal of the second stage, viz., the gate electrode of field effect transistor 65. That is, the signal at point 67 is gated into the second stage when the A signal applied to the gate electrode of field effect transistor 66 is true. In effect, the F signal at point 62 (i.e., output terminal of inverter 16) is sampled and gated into the bit position 13 during B and the signal at point 67 is sampled and gated out of the bit position 13 at point 68 during the true portion of signal A. The signal at point 68 is designated as signal D. This signal is also inverted through inverter 15 and is provided as signal C at point 69.

Bit position 14 is similarly comprised of two half bit stages. The first half bit stage of bit position 14 circuitry bootstrap circuit 70 and field effect transistor inverter circuit 71 connected between −V and electrical ground. The second half bit stage comprises bootstrap circuit 72 connected in electrical series with inverter field effect transistor 73 connected between −V and electrical ground. The D signal at point 68 is gated into bit position 14 during a true signal B which is applied to the gate electrode of sampling field effect transistor 74. Similarly, the output from first half bit stage is gated into the output stage of bit position 14 during a true signal A which is applied to the gate electrode of sampling field effect transistor 75. The output signal from the input half of the bit position 14 is taken from circuit point 76. The output signal E is obtained from the bit position 14 at circuit point 77 and inverted by inverter 16 to generate signal F at point 62.

Figure 4:
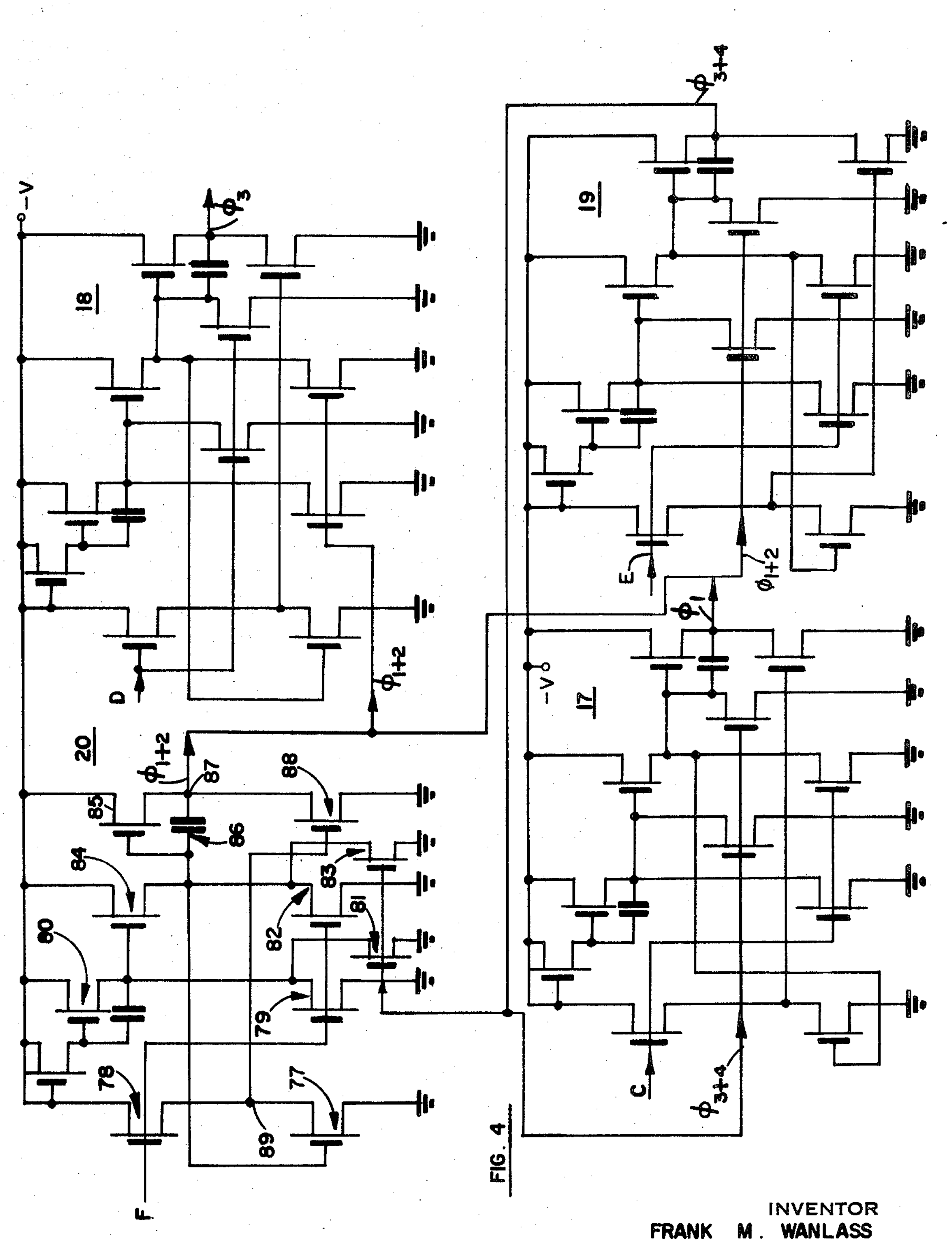
FIG. 4 is a schematic diagram of the output logic gates shown in FIG. 1 implemented by field effect transistors.

FIG. 4 is a schematic diagram of the output logic gates 4 shown in FIG. 1. For purposes of describing a preferred embodiment, the logic gates 4 are shown in the form of NOR gates. The NOR gates 17 through 20 are identical except for the application of different input signals for generating different output multiple phase clock signals. Since the circuitry is identical for each of the NOR gates, only NOR gate 20 will be described in detail.

NOR gate 20 comprises field effect transistor 78 connected in electrical series with field effect transistor 77 between −V and electrical ground. Signal F taken from point 62 shown in FIG. 3, is provided as an input signal to the gate electrode of field effect transistor 78. The F signal is also provided as an input to inverter field effect transistor 79 which is connected in electrical series with bootstrap circuit 80. The bootstrap circuit 80 is connected in series with inverter 79 between −V and electrical ground. The conduction path of field effect transistor 81 is connected in electrical parallel with the conduction path of inverter field effect transistor 79. The gate electrode of field effect transistor 81 is connected to and controlled by multiple phase clock signal $\phi_{3+4}$ taken from the output terminal of NOR gate 19. The F signal and the $\phi_{3+4}$ signal are also applied to the gate electrodes of inverter field effect transistors 82 and 83 respectively. The conduction paths of field effect transistors 82 and 83 are connected in electrical parallel with each other and are connected in electrical series with field effect transistor 84 between −V and electrical ground. Field effect transistor 88, in combination with field effect transistor 85 and capacitor 86 implement a bootstrap driver circuit for providing the output multiple phase clock signal $\phi_{1+2}$ at point 87. Inverter field effect transistor 88 is controlled by the signal level at point 89.

In operation, when signal F is true, field effect transistor 78, field effect transistor 79, and field effect transistor 82 are turned on. As a result, field effect transistor 88 is turned on and field effect transistors 77 and 85 are turned off. Therefore, regardless of the state of the $\phi_{3+4}$ signal, output terminal 87 is at electrical ground. As can be seen in FIG. 5, when the F signal 22 is true, the $\phi_{1+2}$ signal is false.

When the F signal becomes false (i.e. ground level), field effect transistor 78 is turned off as are field effect transistors 79 and 82. If the $\phi_{3+4}$ signal is true, however, field effect transistors 81 and 83 are turned on so that the output $\phi_{1+2}$ at circuit point 87 remains false. That is, circuit point or terminal 87 is connected to electrical ground via conductive field effect transistor 83. However as shown by the signals in FIG. 5, when the F signal is false, the $\phi_{3+4}$ signal is also false. Therefore, the field effect transistor 79, 81, 82 and 83 are turned off in addition to field effect transistor 78. As a result, bootstrap circuit 80 provides a relatively high voltage (e.g., approximately −V) on the gate electrode of field effect transistor 84. Field effect transistor 84 is turned on to provide a drive voltage approximately equal to −V, less one threshold voltage, on the gate electrode of field effect transistor 77. When field effect transistor 77 becomes conductive, point 89 is connected approximately to electrical ground and field effect transistor 88 is turned off. When field effect transistor 88 is turned off, point 87 is driven to approximately −V, the stored charge on the booster capacitor 86 causes the voltage on the gate electrode of field effect transistor 85 to go more negative than one threshold below −V whereby signal $\phi_{1+2}$ becomes true as shown in FIG. 5. Signal $\phi_{1+2}$ is thus provided as an output signal on terminal 5 (of the circuit of FIG. 1) and is also fedback as an input to an NOR gate 18.

The relationship between the inputs to the NOR gate and the multiple phase output signals can be seen by referring to Table 1. The feedback from certain of the output terminals to certain of the NOR gates, provides a synchronized relationship between the various phases of the multiple phase output signals.

It is pointed out, that the description of the preferred embodiment utilizes electrical ground and −V as false and true levels respectively. Since negative voltages are described, it can also be assumed that P channel field effect transistors would be utilized.

It is pointed out that other logic connections and other types of field effect transistors could also be used in implementing other embodiments of the invention. In addition, although MOS devices can be used to implement the multiple phase clock signal generator, other field effect devices including MNOS devices, silicon gate devices, and the like can be used.

I claim:

1. A multiple phase clock signal generator comprising, an RC oscillator circuit generating multiple and phase related signals, a multi-bit shift register in which outputs from certain bit positions of the shift register are inverted and fed back as inputs to other bit positions of the shift register, said shift register being gated by the signals generated by said RC oscillator circuit, and output logic gates generating multiphase clock signals in response to outputs from said shift register and in response to certain multiphase clock signals fed back from the outputs of said logic gates for providing a synchronized relationship between the multiphase clock signals being generated.

2. The multiphase clock signal generator recited in claim 1 wherein said multi-bit shift register has a plurality of bit positions determined as a function of the number of phases of said multiphase clock signals.

3. The multiphase clock signal generator recited in claim 2 wherein the RC time constant of said RC oscillator is selected for generating said signals with a cycle equivalent to one phase of said multiphase clock signals.

4. The multiphase clock signal generator recited in claim 3 wherein said RC oscillator circuit, said multi-bit shift register, and said output logic gates, are implemented by field effect transistors.

5. The multiphase clock signal generator recited in claim 1 wherein said RC oscillator circuit comprises first and second inverter circuits responsive to the charge and discharge voltage levels of the RC circuit for providing a first square wave output signal from said RC oscillator circuit, and a third inverter responsive to said first square wave output signal for providing a second square wave output signal having an opposite phase from said first signal, said second signal being applied to said multi-bit shift register for gating information into said multi-bit shift register, and said first signal being applied to said multi-bit shift register for gating information out of said shift register.

6. The multiphase clock signal generator recited in claim 5 wherein said multi-bit shift register comprises two bit positions, and said output logic gates comprise four logic gates for generating four multiphase clock signals.

7. The multiphase clock signal generator recited in claim 6 wherein said multi-bit shift register includes inverters for inverting the output from both bit positions of said two bit shift register, and said output logic gates comprise four NOR gates responsive to the output signals from both bit positions of said shift register and to the inverted outputs from said bit positions, and responsive to signals fed back from the outputs of said NOR gates for generating four phase related clock signals comprising said multiphase clock signals.

8. The multiphase clock signal generator recited in claim 7 wherein two of said multiphase clock signals have a clock signal width which is twice as large as the clock signal width of the remaining two clock signals.

9. The multiphase clock signal generator recited in claim 1 wherein said RC oscillator circuit comprises first and second inverters, a resistor and a capacitor connected in series between the input and output of said second inverter, said first inverter receiving an input from a common connection between said resistor and capacitor, the output of said first inverter connected to the input to said second inverter, the output of said second inverter being connected to each bit position of said multi-bit shift register for gating information from said multi-bit shift register, and a third inverter connected to the output of said second inverter, the output of said third inverter connected to the remaining bit positions of said multi-bit shift register for gating information into said multi-bit shift register.

10. The multiphase clock signal generator recited in claim 9 wherein the outputs from each bit position of said multi-bit shift register are inverted, the outputs from each of said bit positions and the inverted outputs from said bit positions being provided as inputs to said output logic gates, said signals being generated by said RC oscillator circuit having a cycle equal to one phase of said multiphase clock signals generated by said output logic gates.

11. A multiple phase clock signal generating circuit comprising, oscillator circuit means for supplying regularly recurring signals, shift register means for receiving signals from said oscillator circuit means wherein said signals from said oscillator circuit means control the operation of said shift register means, and output means including a plurality of gate means, each of said gate means having a plurality of input terminals and an output terminal, at least one of said input terminals of each of said gate means connected to said shift register means to receive signals therefrom, the output terminals of some of said gate means connected to the other input terminals of said gate means whereby said output means produces output signals representative of the signals received from said shift register means.

* * * * *